Patented Feb. 23, 1937

2,071,492

UNITED STATES PATENT OFFICE 2,071,492

DYE PROCESS

Spencer U. Boehmer, Lombard, Ill.

No Drawing. Application April 29, 1935, Serial No. 18,880

4 Claims. (Cl. 8—6)

This invention relates to processes for preparing coloring dyes to be used for various purposes, and particularly to dyes which are to be used for coloring food products. The invention has for its object providing suitable processes for producing dyes that are uniform and homogeneous throughout, so that each portion has the same coloring effect as every other portion. In producing dyes, particularly for food products, it is desirable often to mix two or more coloring substances of unlike colors in order to produce a third color. In such cases the substances should be very thoroughly and intimately mixed. If not the resultant substance may produce several different colors; portions of the mixture may produce the original or primary colors and other portions may produce the normal results of the proper mixing of the primary substances, or various shades thereof, depending on which of the primary substances predominates.

With my processes this result is entirely avoided. The processes are such that the resultant substance is entirely homogeneous throughout. The result is an intimate mixture of all of the molecules of the primary substances, a complete homogeneous combination of the molecules themselves, rather than a general mixture of the masses of molecules.

In carrying out my processes I use certain steps in processes which are old, but combine them in a new and effective manner with certain new processes, all of which when so combined produce a greatly improved result.

When producing aniline dyes, such as dyes of the primary colors, such as red, yellow, blue and the like, it is usual to manufacture the primary dyes in water, then to pass the mixture through a suitable filtering apparatus; then remove the filter cake thus produced and dry it thoroughly and grind it to powder. The powder is then used to color foods or other substances in any convenient manner; or at times the powder is mixed with powders of other colors for the purpose of producing certain blended colors or tints.

In carrying out my process I adopt in a general way these manufacturing steps. However, in some cases I omit the drying and powdering steps. My process consists in taking the filter cake produced by the old process and, without drying it ordinarily, I redissolve it in water. I then submit this solution to an enormous pressure, something like 500 to 5000 pounds per square inch, and then spray the solution through a minute aperture into a heated chamber, thus atomizing the solution. During this atomizing process the moisture passes off as a gas or vapor, and the resulting dye substance settles in the chamber as a thoroughly mixed and entirely homogeneous powder.

If dyes are desired which produce colors which are produced by the combination of several primary colors I take the filter cakes of these primary colors, in certain proportions, depending on the particular tint desired, and redissolve these cakes in water, mixing them thoroughly therein, and then spray the mixed solution as above described.

It is to be understood that one object of my invention is to produce powders that are of the same color throughout, showing none of the primary tints, even though the powders are to be finally dissolved in a liquid. The appearance of the powder is thus materially improved and the article is more salable.

In this way coloring substances can be combined to produce homogeneous dyes, either of any primary color or any other color or tint which results from the combination by mixing of two or more primary dyes. The powdered combination that I produce contains less moisture than the powder produced by the ordinary drying and powdering process, and the resultant dye can be used in any ordinary or suitable manner for suitable coloring purposes.

However, it is not essential that the filter cakes be used in carrying out my general process. If desired the powders resulting from the usual drying and grinding process may be used instead. These powders may be redissolved and thoroughly mixed in water, and the resulting mixture may then be sprayed just as described herein with reference to the filter cakes. The result will be a much more intimately combined powder than is produced by mixing the powders in the ordinary way.

In carrying out my process, for instance to produce a dye for imparting to root beer a brown color, of the following proportions by weight of ordinary certified aniline dyes, I take:

79 parts of sunset yellow, 15 parts of amaranth #107, and 6 parts of brilliant blue, all in the ordinary powder form.

These powders are redissolved in water and thoroughly mixed, and the resultant solution is then sprayed as hereinabove described. The result is a coloring powder which is homogeneous throughout and which colors the root beer, or other food, uniformly throughout. By varying the amounts of the primary dyes the tint of brown resulting will vary accordingly.

Another process would be to take the undried filter cakes, which ordinarily are dried and powdered as above described, and redissolve the cakes in water, the proportions of each color being suitable for the desired ultimate color or tint, and then after thorough mixing spraying as before. This will result also in a similar homogeneous brown coloring dye, which when used in the ordinary manner produces no red, yellow or blue, but only uniform brown.

I claim as my invention:

1. A process of producing a homogeneous dry mixture of two or more dyestuffs which consists in dissolving the dyestuffs in a suitable solvent, and spraying said solution under a pressure of between 500 and 5,000 pounds per square inch, into a stream of heated air, to produce a dry homogeneous mixture of said dyestuffs by removal of the solvent therefrom.

2. A process for producing a homogeneous dry mixture of two or more dyestuffs which consists in dissolving the dyestuffs in a suitable solvent and in then spraying the resultant solution into a stream of heated air, to produce a dry homogeneous mixture of said dyestuffs by removal of the solvent therefrom.

3. A process for producing a homogeneous dry mixture of two or more dyestuffs which consists in dissolving the dyestuffs in a suitable solvent, in then thoroughly mixing the resultant solution and in then spraying the resultant mixture into a stream of heated air, to produce a dry homogeneous mixture of said dyestuffs by removal of the solvent therefrom.

4. A process of producing a homogeneous dry mixture of two or more dyestuffs which consists in mixing the dyestuffs in a suitable solvent, and in then spraying the resulting mixture in a very finely atomized state into a stream of heated air, to produce a dry homogeneous mixture of said dyestuffs by removal of the solvent therefrom.

SPENCER U. BOEHMER.